L. Hull,
Working Rattan.

Nº 13,354.                        Patented July 31, 1855.

UNITED STATES PATENT OFFICE.

LIVERAS HULL, OF CHARLESTOWN, MASSACHUSETTS.

MACHINE FOR SAWING RATAN.

Specification of Letters Patent No. 13,354, dated July 31, 1855.

*To all whom it may concern:*

Be it known that I, LIVERAS HULL, of Charlestown, in the county of Middlesex and State of Massachusetts, have invented a new and useful Machine for Sawing Ratans; and I do hereby declare that the same is fully described and represented in the following specification and the accompanying drawings, letters, figures, and references thereof.

Figure 1:
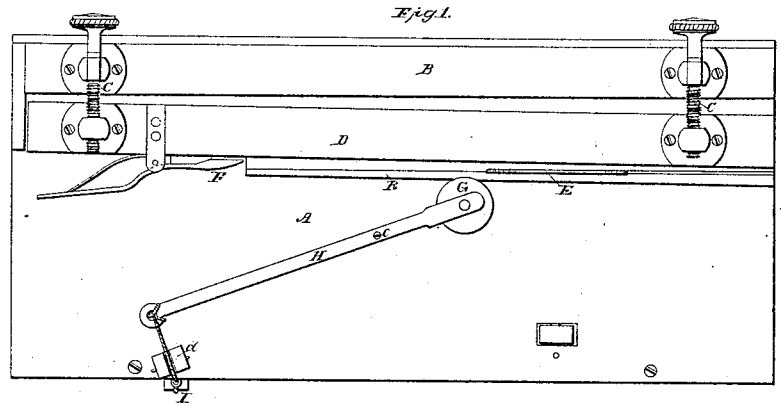
Figure 3:
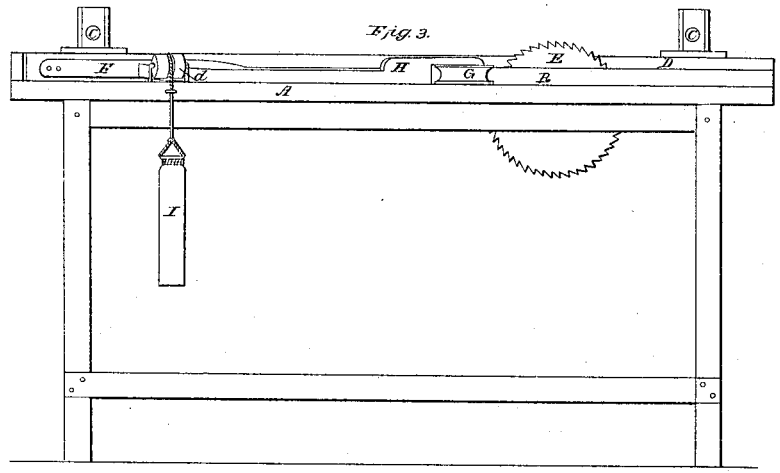
Figures 2, 4:
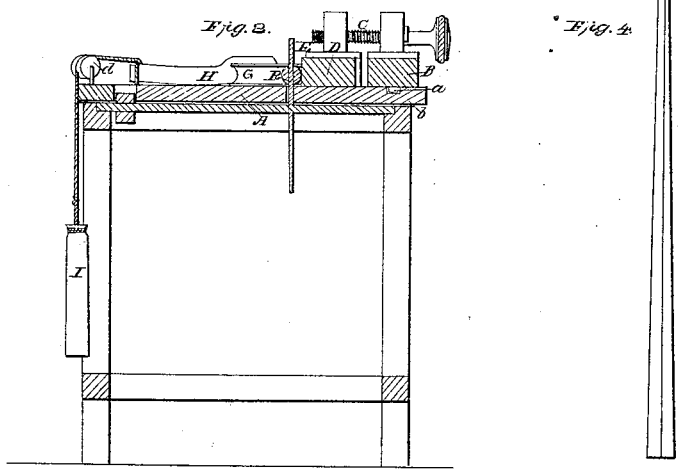

Of said drawings, Figure 1 denotes a top view of my said machine. Fig. 2, is a vertical and transverse section of the same. Fig. 3 is a side elevation of it.

In these drawings, A, represents a table upon which is supported a carriage or bar B, that has a rib or projection, a, extended from the lower side and entering a rectangular groove, b, made longitudinally in the upper surface of the table, the object of such ledge and groove being to cause the carriage or bar B, when moved to move rectilinearly. Connected with the said bar B, by means of adjustable screws, C, C, is another bar or ruler, D, which lies upon the top surface of the table and is what I term the adjustable holding bearer, its object being not only to form a continuous bearing to the ratan while it is being sawed, but also to direct it against the circular saw E, so that the latter shall pass through it diagonally, one end of the said ratan being gripped to the holding bar by means of spring lever clamp F, applied thereto as seen in Fig. 1. The saw E is arranged with its plane perpendicular to the surface of the table and parallel to the line of movement of the carriage, B, its plane during such movement making an acute angle to that of the adjacent vertical edge, or surface of the bearer D. In advance of the saw or between it and the clamp F, and at a short distance from the saw there is arranged a pressure roller, G, whose periphery is grooved to fit the cylindric surface of a strip of ratan when borne against it. This roller has its plane standing horizontally, or has its axis parallel to the plane of the saw, such roller being carried by a lever H, which works upon a fulcrum, c, and has a weight, I, suspended from its longer arm and made to pass over a pulley d, so as to cause the roller to be forced against the ratan and maintain it firmly against the bearer D, during the operations of the saw.

My machine is especially adapted for sawing ratan diagonally and longitudinally so as to enable it to be used in the manufacture of whip stocks. It is well known that owing to the fibrous character of the ratan or manner in which the fibers of it are disposed it is very difficult to split it diagonally, and it requires great expertness on the part of a workman to accomplish such in a regular and proper manner, as he is obliged with his knife to continually cut across the grain or fibers.

After a stick of ratan has been cut the broadest ends of the two pieces are laid together, in manufacturing a whip stock, the same being for imparting to the stock a regular taper.

In Fig. 1, of the drawings, the stick of ratan is exhibited at R, while in Fig. 4, is shown the manner in which its parts are laid together as specified.

I am aware that machines have been contrived for splitting a ratan longitudinally with one or more knives, the ratan having been supported between a series of rollers. I am also aware that timber attached to a rectilinear moving carriage by dogging contrivances applied to its end has been cut diagonally by means of a saw. I am aware also that it is not new to use an adjustable gaged bar, in connection with a movable carriage and saw. I am also aware that pressure rollers are used in planing machines for maintaining a board against a movable carriage or bed during the operation of planing or dressing it. The employment of such parts in a machine for sawing ratan requires a specific arrangement of them or one which differs essentially from their arrangement in various other kinds of mechanism, such an arrangement having been hereinbefore explained.

I therefore claim—

The above described arrangement of the rectilinear moving carriage B, the adjustable holding bearer D, the groove pressure roller, and the saw, whereby when a stick of ratan is clamped to the adjustable bearer and the carriage B, is moved forward so as to carry the said stick endwise against the saw while the latter is in revolution, such stick shall be sawed in a diagonal direction in manner and for the purpose as specified.

In testimony whereof I have hereunto set my signature, this twenty fifth day of May A D 1835.

LIVERAS HULL.

Witnesses:
W. H. EDDY,
F. P. HALE, Jr.